(12) United States Patent
Levering et al.

(10) Patent No.: US 7,979,333 B2
(45) Date of Patent: Jul. 12, 2011

(54) METHOD FOR CREATING AND DELIVERING CUSTOMIZED COMPLIANCE INFORMATION

(76) Inventors: Jeffrey B. Levering, Harvard, MA (US); Alex Magary, Andover, MA (US); Craig LeClair, Lexington, MA (US); Larry Kunz, Wayland, MA (US); Anil Gupta, Chelmsford, MA (US); Brigitte Tuller, Chester, NH (US); Garett Wiley, Marblehead, MA (US); Patricia Rosch, Caledon (CA)

( * ) Notice: Subject to any disclaimer, the term of this patent is extended or adjusted under 35 U.S.C. 154(b) by 0 days.

(21) Appl. No.: 12/875,002

(22) Filed: Sep. 2, 2010

(65) Prior Publication Data
US 2011/0060697 A1 Mar. 10, 2011

Related U.S. Application Data

(63) Continuation of application No. 10/877,904, filed on Jun. 25, 2004, now abandoned.

(60) Provisional application No. 60/482,317, filed on Jun. 25, 2003.

(51) Int. Cl.
*G06Q 40/00* (2006.01)
(52) U.S. Cl. .......................... 705/35; 705/37
(58) Field of Classification Search ............ 705/35, 705/37
See application file for complete search history.

(56) References Cited

U.S. PATENT DOCUMENTS

| | | | |
|---|---|---|---|
| 5,802,518 A | 9/1998 | Karaev et al. |
| 5,819,271 A | 10/1998 | Mahoney et al. |
| 5,864,871 A | 1/1999 | Kitain et al. |
| 5,893,079 A | 4/1999 | Cwenar |
| 5,987,434 A | 11/1999 | Libman |
| 6,076,072 A | 6/2000 | Libman |
| 6,385,655 B1 | 5/2002 | Smith et al. |
| 7,062,458 B2 | 6/2006 | Maggioncalda et al. |
| 7,640,182 B2 | 12/2009 | Wallman |
| 2001/0034680 A1 | 10/2001 | Purcell |
| 2001/0037234 A1 | 11/2001 | Parmasad et al. |
| 2002/0038273 A1 | 3/2002 | Wherry et al. |
| 2003/0163686 A1 | 8/2003 | Ward et al. |
| 2003/0174154 A1 | 9/2003 | Yukie et al. |
| 2004/0117280 A1 | 6/2004 | Klee et al. |
| 2005/0010857 A1 | 1/2005 | Shmukler et al. |
| 2005/0125316 A1 | 6/2005 | Levering et al. |
| 2008/0195516 A1 | 8/2008 | Levering et al. |

OTHER PUBLICATIONS

Search Report for International Application No. PCT/US04/20510 dated Nov. 30, 2006.
Securities and Exchange Commission; 17 CFR Parts 231, 241 and 271; Release No. 33-7233; 34-36345; IC-21399; File No. S7-31-95; RIN 3235-AG67 Use of Electronic Media for Delivery Purposes http://www.sec.gov/rules/interp/33-7233.txt; Oct. 6, 1995, 30 pgs.
ADP Investor Communications: The Industry's Best-Kept Secret; A Special Supplement to the Shareholder Service Optimizer,(c) Dec., 2002, 2 pgs.
Specht, R., "Cost-Effective, Efficient Investor Communications: A Closer Look a the Real World", Communicating with Investors Cost-Effectively, (c) Nov. 2000, 2 pgs.
PostEdge, Pro and Post Sale Communication and Distribution Services in One Easy Solution; ADP Link vol. 4, No. 1, Jan. 2000, 2 pgs.

*Primary Examiner* — Jagdish Patel
(74) *Attorney, Agent, or Firm* — Greenberg Traurig, LLP

(57) ABSTRACT

A method and system to create personalized investor information packages, based on investor information, to be delivered to the investor to satisfy both compliance regulations and investor preferences. The method and system may deliver information in a paper or electronic format.

34 Claims, 5 Drawing Sheets

METHOD FOR CREATING AND DELIVERING CUSTOMIZED COMPLIANCE INFORMATION

RELATED APPLICATION

This application is a continuation of U.S. Ser. No. 10/877,904, filed Jun. 25, 2004 now abandoned, which claims the priority of provisional application Ser. No. 60/482,317, filed on Jun. 25, 2003. Each of the aforementioned applications is incorporated herein by reference in its entirety for all purposes.

TECHNICAL FIELD

This invention relates to providing securities information to investors.

BACKGROUND INFORMATION

Increasing numbers of individuals every day are conducting their personal financial business, such as banking and investing, on-line. Today, with access to the Internet so prevalent, many are actively managing their own stock portfolios on a day-to-day basis. The efficiencies gained by using the services of on-line brokerages such as E*Trade, Datek, and Ameritrade, have made the associated per-trade costs sufficiently low to make such transactions economically feasible for an individual.

While the Internet has allowed increased access to the trading of stocks, effectively lowering the barrier of entry for an individual, on-line brokerages must still comply with reporting rules from the United States Securities and Exchange Commission (SEC). With respect to the purchase of certain securities such as mutual funds, a user must be provided with certain documents, such as a fund prospectus prior to the purchase of any shares in the mutual fund. In addition, after purchasing shares in a mutual fund, subsequent reports also must be sent to the investor.

Compliance information, as used herein, is information which must be provided to individuals to comply with the regulations of a governing body or non-governmental regulating body. Securities information is a general term which relates to any information dealing with securities and/or securities related transactions. Correspondence relating to securities, filing information, holding information, prospectus information are all examples of securities information. Certain types of information may be both compliance information and securities information, such as when securities information is information about a security that a government or a stock exchange requires be made available or delivered to an investor (or potential inventor) in that security. For example, the SEC and the National Association of Securities Dealers ("NASD") each requires the filing of certain information by an issuer of securities; this is an example of securities information that is also compliance information. The SEC and NASD require that a certain subset of the securities information be made available to an investor in a security—this is also compliance information, and is also referred to as regulated financial information documents ("RFID").

One example of compliance information is a mutual fund prospectus. The mutual fund prospectus could be located somewhere within a filing that also contains other securities information, such as an amendment to a different prospectus, or a semi-annual report. Compliance information for a mutual fund may include, but is not limited to, prospectuses, supplements to prospectuses ("stickers"), statements of additional information ("SAI"), supplements to SAIs, annual reports, and semi-annual reports. Certain sales and marketing information can also be considered compliance information since its distribution is also regulated by government agency and stock exchange rules. As another example, compliance information for a variable annuity fund includes the compliance information for the variable annuity fund, and the compliance information for each of the funds available for investment.

Recently, government agencies and securities exchanges have begun allowing securities issuers and intermediaries to comply with information delivery requirements by approving the delivery of the information in an electronic format, for example, by transmitting the information from one computer to another over a computer network. The SEC currently requires that investors consent to receiving compliance information in an electronic format. One method for obtaining such user consent is described in U.S. patent application Ser. No. 09/023,039 filed on Feb. 12, 1998 and herein incorporated by reference. Electronic delivery of compliance information has significantly reduced costs for entities which are required to disclose securities information.

Securities information is available in various electronic databases including the Securities SEC's EDGAR database. EDGAR, the Electronic Data Gathering, Analysis, and Retrieval system, performs automated collection, validation, indexing, acceptance, and forwarding of submissions by companies and others that are required by law to file information with the SEC. The primary purpose of EDGAR is to increase the efficiency and fairness of the securities market for the benefit of investors, corporations, and the economy by accelerating the receipt, acceptance, dissemination, and analysis of time-sensitive corporate information filed with the agency. EDGAR information is available on the Internet at www.sec.gov. Other bodies such as the United States Internal Revenue Service ("IRS") may also offer similar storage of information which may be relevant to the exchange of securities.

Although securities information is available from databases like EDGAR, the information is not readily available in a useful electronic format that enables compliance with government and securities exchange regulations, especially with regard to mutual funds and other non-corporate securities. EDGAR, as a result of its design, makes information regarding non-corporate securities difficult to find. In EDGAR, mutual fund information, for example, is listed as a submission of the corporate issuer, not the fund name that is marketed to the consumer, and one submission may include information for more than one mutual fund. EDGAR submissions also may include updates and amendments to earlier submitted information. It is quite possible for a single mutual fund to have more than fifty amendments to its compliance information. An investor attempting to locate the complete set of compliance information for a mutual fund directly from EDGAR would need to retrieve all applicable amendments. This is time-consuming, and it is difficult for the investor, when attempting to gather compliance information from EDGAR, to know if all the amendments have actually been located, if the retrieved information about the fund is complete, or if the retrieved information is up-to-date.

Before securities information is distributed to investors it may be updated and "cleaned" so that the information appears in a more useful format to the investor. One process for processing raw securities data into a useable format is described in U.S. Pat. No. 6,122,635, issued on Sep. 19, 2000 and herein incorporated by reference.

Despite the availability of delivering compliance information in electronic form, many entities still rely on more traditional paper methods of delivering compliance information. One obstacle to widespread electronic delivery is the variable nature of the industry. Due to heavy regulation by federal and state agencies, financial institutions that manufacture and distribute securities information have been at a disadvantage in building new delivery solutions.

As a result, entities rely on the industry practice, which is to send each investor the contract prospectus and all sub-account prospectuses in which the investor may allocate funds. This procedure is normally practiced for both pre-sales materials and on an annual basis after an account is opened. According to NAVA's Annuity Fact Book, the average number of sub-accounts available in a retail contract was 33 in 2001. Using average page counts derived from the EDGAR database, this means the industry is sending an average of over 3000 pages to an investor per year. This results in over 30 billion pages produced annually for the industry.

These pages are typically sent in three mailings occurring in February, May, and August each year. Annual reports for all sub-accounts (on average 33) are sent in February. May is the largest mailing and includes the contract and sub-fund prospectus. In August, semi-annual reports for the sub-funds are sent. Annual and semi-annual mailings must begin within 60 days of the closing of the relevant sub-fund accounting period. This is for the average of 33 sub-accounts per contract, regardless of the investor's allocation. This system yields billions of pages of compliance information are printed and shipped to warehouses. Workers then pick documents from shelves and pack them into envelopes for shipment, or the individual documents are combined into large books of paper that can be large and heavy. Those documents are expensive to maintain and to ship, and frequently are wasted as compliance information can rapidly change and quickly render pre-printed pamphlets obsolete.

On the investor side, the system can be overwhelming. Individual investors receive thousands of pages a year, much of it irrelevant to the particular investor.

The current system is unsatisfactory to both investors and brokerages.

SUMMARY OF THE INVENTION

What is offered is a system for distributing compliance information to a user, the system comprising: a compliance information manager which gathers compliance information from one or more sources; a preference database which stores data regarding delivery instructions for at least one user; a distribution controller which determines how a user should receive compliance information based on said delivery instructions; and a distribution manager which initiates publication of at least a portion of the compliance information to the user based on a determination made by the distribution controller.

The publication may comprise sending a physical copy of the portion of the compliance information to the user. The distribution controller may be located on the same machine as the distribution manager. The publication may be initiated by the distribution manager is executed by publishing the portion of the compliance information to the user in an electronic format. The distribution controller may also determine how a user should receive compliance information further based on compliance rules governing said compliance information The portion of the compliance information may contained in the body of an e-mail message and may be sent as an attachment to an e-mail message. The compliance information in electronic format may be located on an information storage device sent to the user. The compliance information in electronic format may be stored on a server which is accessed by the user; the server may be located on the same machine as the distribution manager.

The distribution manager may format the portion of the compliance information prior to publication. The data regarding delivery instructions stored by the preference database may include preferences of the user and/or those of a brokerage. The compliance information may comprise securities information. The securities information may comprise at least one mutual fund prospectus. A portion of the compliance information gathered by the compliance information manager may be obtained from EDGAR, a brokerage, a publicly traded corporation and/or another source.

The distribution manager may record the publication of at least a portion of the compliance information to the user. The distribution manager may report the publication of at least a portion of the compliance information to the user to a brokerage, and/or a compliance enforcing body; the compliance enforcing body may be the SEC.

The system may further comprises a print manager, wherein: the distribution manager initiates publication of at least a portion of the compliance information to the user by sending a request to the print manger, and wherein the print server causes a physical copy of the at least a portion of the compliance information which conforms with the determination made by the distribution controller to be printed and sent to the user. The print server may print and send physical copies of portions of compliance information together in a manner which takes advantage of bulk rates. The distribution manager and the print server may be located on the same server. The preferences of the user may include one or more of the following types of information: contact information, holdings information, display information, or delivery preferences. The preferences of the user may be obtained from the user, and/or from a brokerage.

The portion of compliance information may be published to the user along with non-compliance information; the non-compliance information may be published to the user in accordance with the delivery instructions. The delivery instructions may include information regarding prior publications of compliance information to the user.

Publication may be initiated in response to a transaction by the user and/or in response to a new or altered piece of compliance information. The compliance information manager may gather compliance information daily. The existence of a need to publish compliance information may also determined daily.

A method is also offered for distributing compliance information to a user, the method comprising: obtaining compliance information from one or more sources; obtaining delivery instructions for at least one user; determining how a user should receive compliance information based on said delivery instructions; and initiating publication of at least a portion of the compliance information to the user based on the determination. The method may be varied in ways similar to the system as described above.

Also offered is a method for providing securities information to a user, the method comprising: obtaining user information; obtaining securities information; identifying, based on the user information, a portion of securities information to deliver to a user; customizing, based on the user information, the portion of securities information; and sending the customized portion of securities information to the user. The method may be varied in ways similar to the system as described above.

The system and methods described above may be used for securities information instead of compliance information.

Also offered is a method for distributing securities information to a user, the method comprising: obtaining electronic securities information from EDGAR; processing the electronic securities information according to securities holdings of a user; providing to the user a portion of the electronic securities information related to the holdings of the user. The method may be varied in ways similar to the system as described above.

Also offered is a method for delivering compliance information to an investor, the investor participating in an investment plan, the investment plan offering a plurality of securities to the investor, the investor owning a first portion of the plurality of securities and not owning a second portion of the plurality of securities, the compliance information comprising data which an issuer of a security provides to an investor pursuant to SEC requirements, the method including acts of: (A) selecting a body of compliance information which is related only to the first portion of the plurality of securities; and (B) delivering the body of compliance information to the investor. The method may be varied in ways similar to the system as described above.

BRIEF DESCRIPTION OF THE DRAWINGS

In the drawings, like reference characters generally refer to the same parts throughout the different figures.

DETAILED DESCRIPTION

Figure 1:
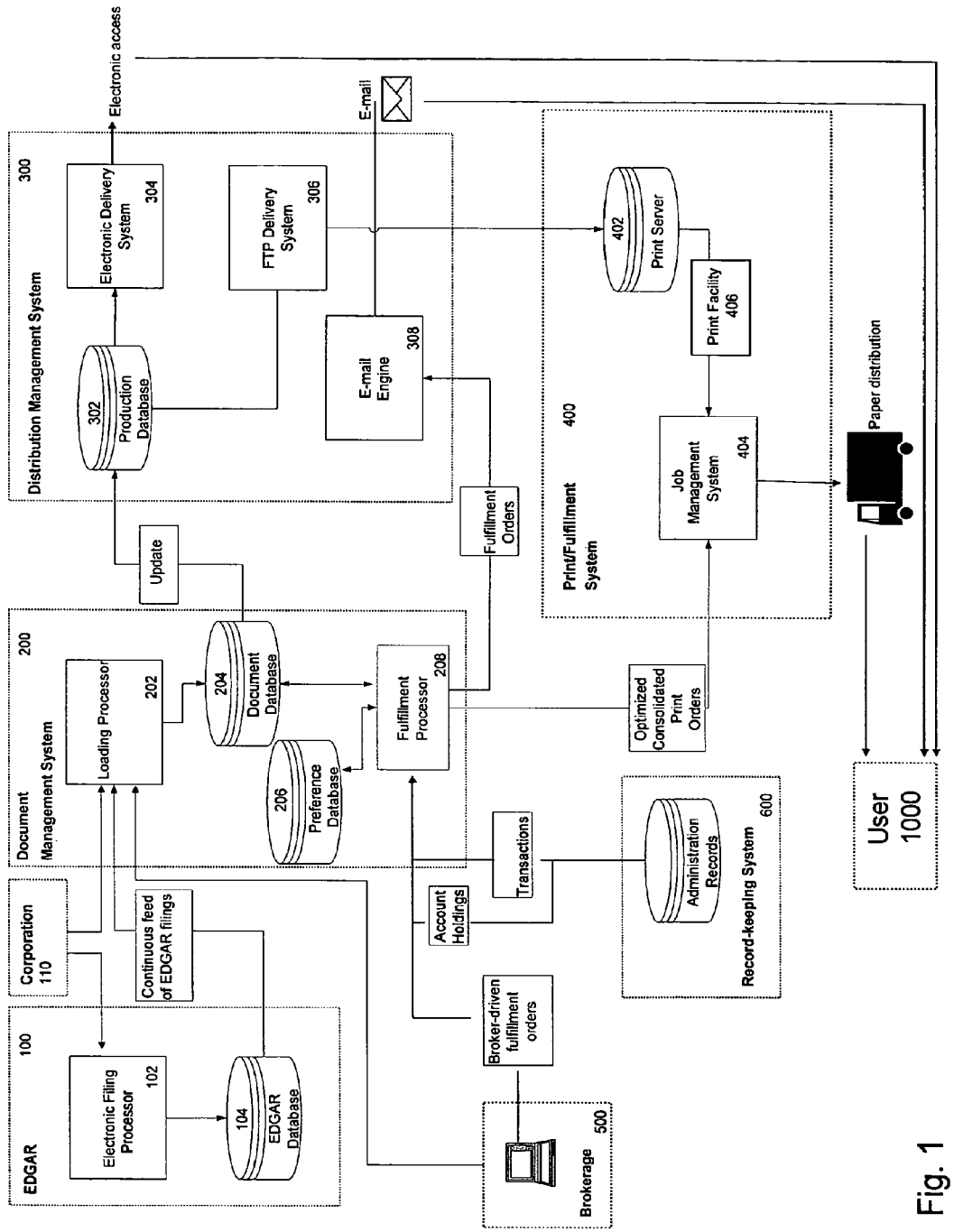
FIG. 1 shows a high level overview of the document management and delivery system according to one embodiment.

A method and system are offered to create and publish personalized investor versions of the large information packages, based on knowledge of the investor portfolios, compliance business rules, preference information and the information databases. This blended print and electronic delivery solution combines the Internet and customized printing methods to replace traditional physical warehousing of traditional offset printed documents. As used herein, the term "publication" or "publish" means to disseminate information. Unless specifically noted otherwise, the terms "publication," "publish," or the like do not require a particular medium, such as a physical written item, but rather are media neutral.

Brokerages and information providers prefer disclosing information in electronic format as it allows for easy and fast distribution to multiple recipients and users (here the terms "user" and "investor" are used interchangeably) may prefer electronic delivery for its speed and ease of handling.

As used herein the terms investor, individual and user are inclusive of both the single person who invests and the larger entity (such as small firm or investment manager) which may make use of a preference based document delivery system.

Certain users, however, may still prefer receiving compliance information in paper form for a variety of reasons including ease of reading, lack of reliable computer service, etc. Users also may have specific preferences on how they receive compliance information. Using traditional methods of paper delivery which mass produce documents and send them to investors, there is no way to account for those preferences, since no brokerage or company would format compliance information differently for each investor due to the prohibitive cost.

The present system offers delivery of compliance information which incorporates delivery preferences and supports full document management and distribution. Here, the database understands who gets what, when they need to receive it, and how the document should be delivered, i.e., in a formatted print document or by e-mail. This preference based system and method insures that investors are not burdened with unnecessary documents and receive all required documents. As such, the method and system offered easily deliver compliance information which is formatted according to individual preferences. The disclosed system and method may be performed by individuals rather than computer components and the following disclosure should be read accordingly.

In one embodiment of the system, a user provides preference information which can include information relating to how the user prefers to see documents (such as font, formatting, print versus electronic, etc.), what documents they receive (such as all compliance information, accounts statements only, general security information only, etc.) and any other preference which may affect how a user wants to receive his/her information. Those preferences are stored by the system and are used to format specific electronic compliance information into a user preferred form. Once the preference information is received from the user, the compliance documents may then be published to the user either electronically, in print, or by any other means according to those preferences.

Additionally, other preferences may be taken into account when providing document delivery. For example, in the case of delivering securities information, a brokerage or fund company may have preferred methods of delivering information to its customers (for example, to maintain a consistent image or presentation format). Those brokerage preferences may also be taken into account when creating the customized documents to be published to the user.

Figure 2:
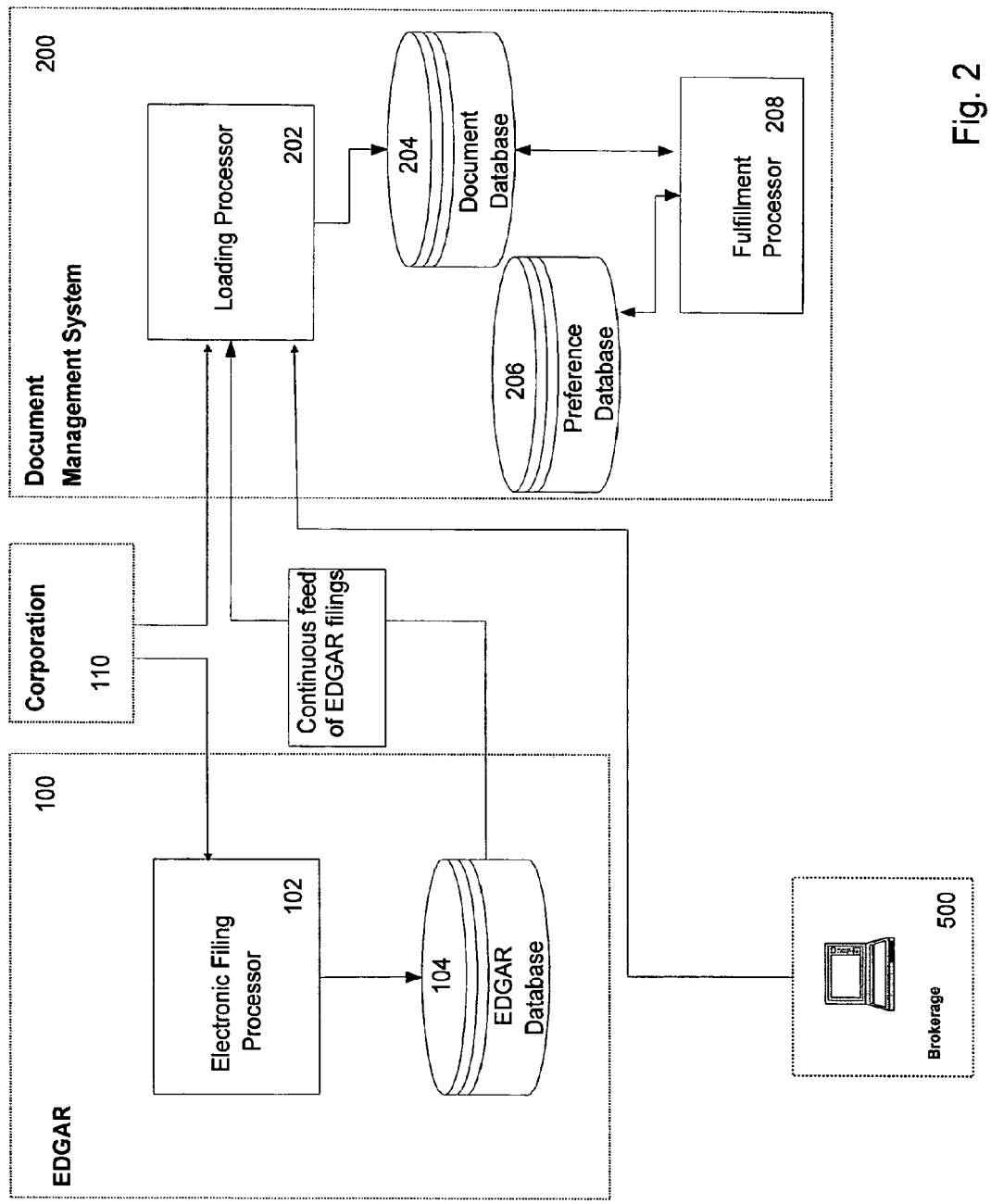
FIG. 2 shows how data may be loaded into the system according to one embodiment.

FIG. 1 shows an overview of the document creation system according to one embodiment. Although the system described in FIG. 1 may be implemented with many types of information, for ease of illustration FIG. 1 shows the document creation system as applied in the area of securities information. FIG. 2 shows how data may be loaded onto the system according to one embodiment. Securities data, which may later comprise portions of compliance information, is sent to EDGAR 100 from a corporation 110. Typically this data is sent from the corporation 110 in plan text or stylized HTML and is filed with the SEC electronically to be stored in EDGAR 100. This data may satisfy the corporation's disclosure requirements. EDGAR's electronic filing processor 102 receives the securities data and stores it in the EDGAR database 104.

Each security may be assigned an identification number, such as a CUSIP number. Additionally, a security may be identified by an internal identification number, and/or a stock ticker symbol. The internal identification number is unique for each security. A CUSIP number is a number assigned by Standard & Poor's CUSIP (Committee on Uniform Securities Identification Procedures) Service Bureau, the manager of the American Banking Association's CUSIP number system, to identify a security. A stock ticker symbol is a symbol assigned by a stock exchange to identify a security. An investor is likely to reference a security, such as a mutual fund, by any one of: the fund name marketed to the consumer, the CUSIP number, or the stock ticker symbol, and not by the investment company name or the central index key. The system may use these unique identifiers in obtaining information from EDGAR 100, or in eventually distributing compliance information to the user 1000.

A document management system 200 obtains the securities data from EDGAR 100. As EDGAR 100 is constantly updated, the document management system updates its data from EDGAR as often as possible, preferably with a continuous feed. A compliance information manager then gathers this information. In the embodiment shown the compliance information is managed by the loading processor 202 and stored on the document database 204. Although called the document database 204, the compliance information it stores may be stored either as discrete documents (such as a word file or a .pdf document) or as a collection of data. The system is capable of dealing with either kind of information as in certain cases discrete documents will be preferable and in other cases a collection of data will be preferable. The loading processor 202 obtains the securities data from the EDGAR database 104, processes the data, and stores it in the document database 204.

Processing of the EDGAR data is preferable, as the raw form of data obtained from EDGAR 100 may be difficult for a user 1000 to understand. The processing of the raw data may include cleaning and tagging. Cleaning generally comprises reformatting the raw data into a more usable document form. Tagging generally comprises marking certain aspects of data so that they may be easily found. Data points which may be tagged include CUSIP numbers, fund name, revenues, etc. Document tagging is useful for quickly identifying specific pieces of information within a large securities document which may be relevant to investors, brokerages, or other parties. One method of tagging data may be found in U.S. patent application Ser. No. 10/135,834, filed on Apr. 30, 2002 which is herein incorporated by reference. The tagging process analyzes the securities data and identifies certain components to the highlighted. Certain business rules may also be applied including associating documents with the appropriate CUSIP number so that documents can be matched to specific securities. After the data is processed, the system may perform quality assurance to ensure that the securities data was acquired, cleaned, and tagged properly.

Once the quality of the processing has been checked the securities data may be formatted into distinct documents which are associated to specific securities and may be easily sent to investors or modified according to user information. Once those documents are formatted the document management system 200 may undergo a content check to ensure the documents are current with the most recently filed documents. The documents are then stored in the document database 204. The document management system 200 may also be used with other compliance information such as trade confirms, statements, or similar documents.

The document management system 200 may also obtain securities data from other sources. Shown in FIG. 2 are two such sources, the corporation 110 and the brokerage 500. Other such sources includes news organizations, websites, etc. Securities data obtained from other sources may also be manipulated by the loading processor 202 in a similar manner as data obtained from EDGAR 100 prior to storage in the document database 204.

Documents are preferably stored in the document database 204 in a manner which allows easy distribution based on user preferences as described below. If necessary the loading processor 202 will create and format summaries, supplements or custom files for certain securities such as mutual funds in order to assist eventual publication to the user.

In addition to obtaining securities information, the document management system also obtains preference information to be stored in the preference database 206. Preference information may include any type of information which dictates how information is preferably sent. This preference may be on the part of a user 1000, brokerage 500 or other entity.

User preferences may include information about any number of ways a user is to receive his/her compliance information and what compliance information he/she is to receive. User preference data may include, but is not limited to, preferences regarding appearance, content, delivery, contingencies, rules based on times (such as day or year), rules based on types of information, etc. The user may specify specific fonts, formats, text size, languages, or any variety of graphical appearance. When the system is used with securities the preference information may also incorporate holding information which indicates which securities the user owns or has an interest in. These may be identified by CUSIP, stock ticker code, fund name, or other identification. This information may be regularly updated and recorded to guarantee that the information sent to the user meets compliant disclosure requirements. For example, if an investor sells out of a particular security early in the year and later re-purchases the security, the document management system 200 and preference database 206 may keep track of which information has been sent to the investor so that the investor will not be re-sent any compliance information he/she has already received. Of course, any new information, if applicable, will be sent in order to remain compliant. User preference information may also include a request to be sent compliance information for a security which the investor has not yet purchased, but is interested in purchasing. This type of pre-sale disclosure may be useful to the investor and may satisfy certain pre-sale disclosure requirements.

Other user preferences may dictate the order in which documents are sent, the date and/or time they are sent, the location to which they are sent, the individual to whom they are addressed, or other delivery information. User preference information may also incorporate the level of user consent to receive information electronically. Delivery instructions and preference information may contain many particular choices, but also may simply indicate that a user prefers a default publication, whatever that may be. Delivery instructions and user preference may be varied and the system is designed to be flexible to the myriad preferences each user may have.

Preference information may also be obtained from a brokerage 500 or other source. A brokerage 500 may also have preferences as to how or when information is presented to its customers. Those preferences may be incorporated by the document management system 200 and used by the fulfillment processor 208. Preferably, the preference information is updated continuously so that the preference database 206 is kept as current as possible.

Although not indicated directly in FIG. 1 or FIG. 2, preference information may be sent to the document management system 200 through a variety of channels. They may be sent electronically in an e-mail or through an Internet website. They may be sent directly to the system or through an intermediary such as a brokerage. They may also be entered manually from a paper submission or obtained over the telephone. Once the preferences are obtained they are stored in the preference database 206. The preference information may then be used to create delivery instructions which dictate how the securities data is to be sent. If there are any conflicts in preference information (for example when user preferences are contradictory or when preferences which are contradictory between a user and a brokerage) these conflicts may be resolved by rules applied by the fulfillment processor 208.

The fulfillment processor 208 may function as a distribution controller which determines, among other things, how a user should receive compliance information based on the preference information and forwards that information to the distribution management system 300 and the print/fulfillment system 400. The fulfillment processor 208 also processes orders for the delivery of compliance information by the system. Any number of events may trigger the publication of compliance information to a user including, but not limited to, a particular time event (such as the beginning of the calendar year), transfer event (such as a user obtaining or divesting a security), market event (such as a stock split or corporate takeover) or other event. With other forms of compliance information outside the area of securities, the particular compliance rules may dictate when compliance information is to be published to a user. The fulfillment processor 208 may take compliance rules into account when determining how compliance information is to be published.

Figure 3:
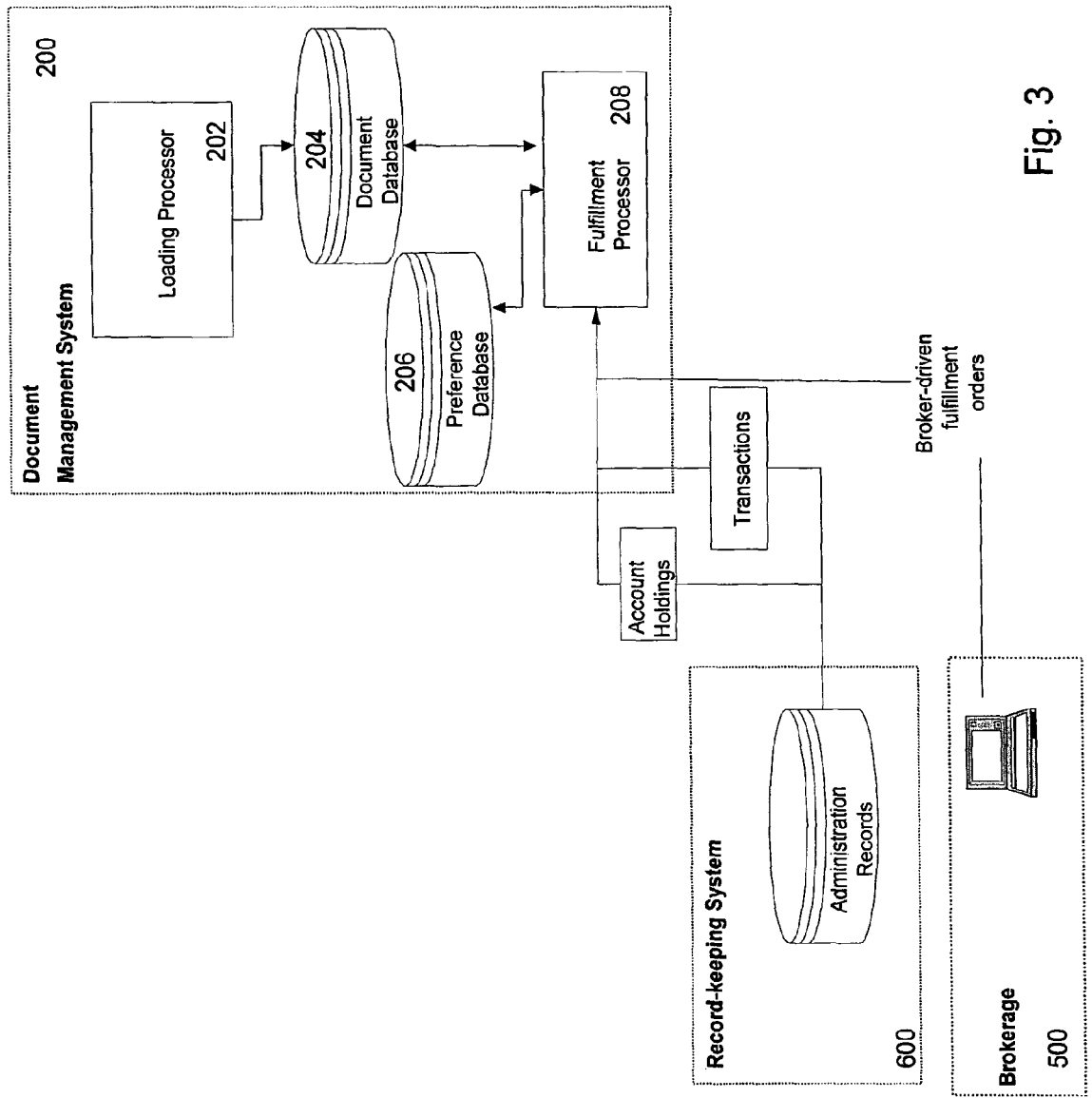
FIG. 3 shows how documents delivery orders may be formulated by the system according to one embodiment.

As shown in FIG. 3 the fulfillment processor 208 may receive fulfillment orders from a brokerage 500 or from some other record-keeping system 600. Communication between the document management system 200 and the brokerage 500 or other entities is preferably done electronically (such as through a network connection or through an Internet website) but may be done over any medium including telephone, paper, wireless, or other communication method. Fulfillment orders may also come from other sources, such as directly from the user 1000 or from the compliance governing body (such as the SEC). Fulfillment orders are an example of a request for the document management system 200 to publish compliance information. The record-keeping system 600 may be associated with a brokerage, may be internal to the document management system 200 or may be associated with a different entity which supplies holding information to the document management system 200. The fulfillment processor 208 may receive fulfillment orders individually or in batches. It may also receive information regarding a user's account holdings or a user's transaction information from the record-keeping system 600. This information may be used to ensure that the user is receiving the proper portion of the compliance information and to send further compliance information if appropriate. The fulfillment processor 208 checks the fulfillment orders against its own internal rules, as well as those stored in the preference database 206, and then forwards the checked fulfillment orders to the distribution management system 300. Publication of compliance information may also be initiated by without being prompted. When deciding what compliance information to publish to a user, and when to publish it, the fulfillment processor 208 may also take into account rules governing the compliance information (for example those rules set by the SEC which govern the exchange of securities information) as well as information provided by the record-keeping system 600, the brokerage 500, the user 1000, or other information. While the fulfillment processor 208 preferably initiates publication, the publication itself may be handled by a separate system, including the distribution management system 300 or the print/fulfillment system 400.

Figure 4:
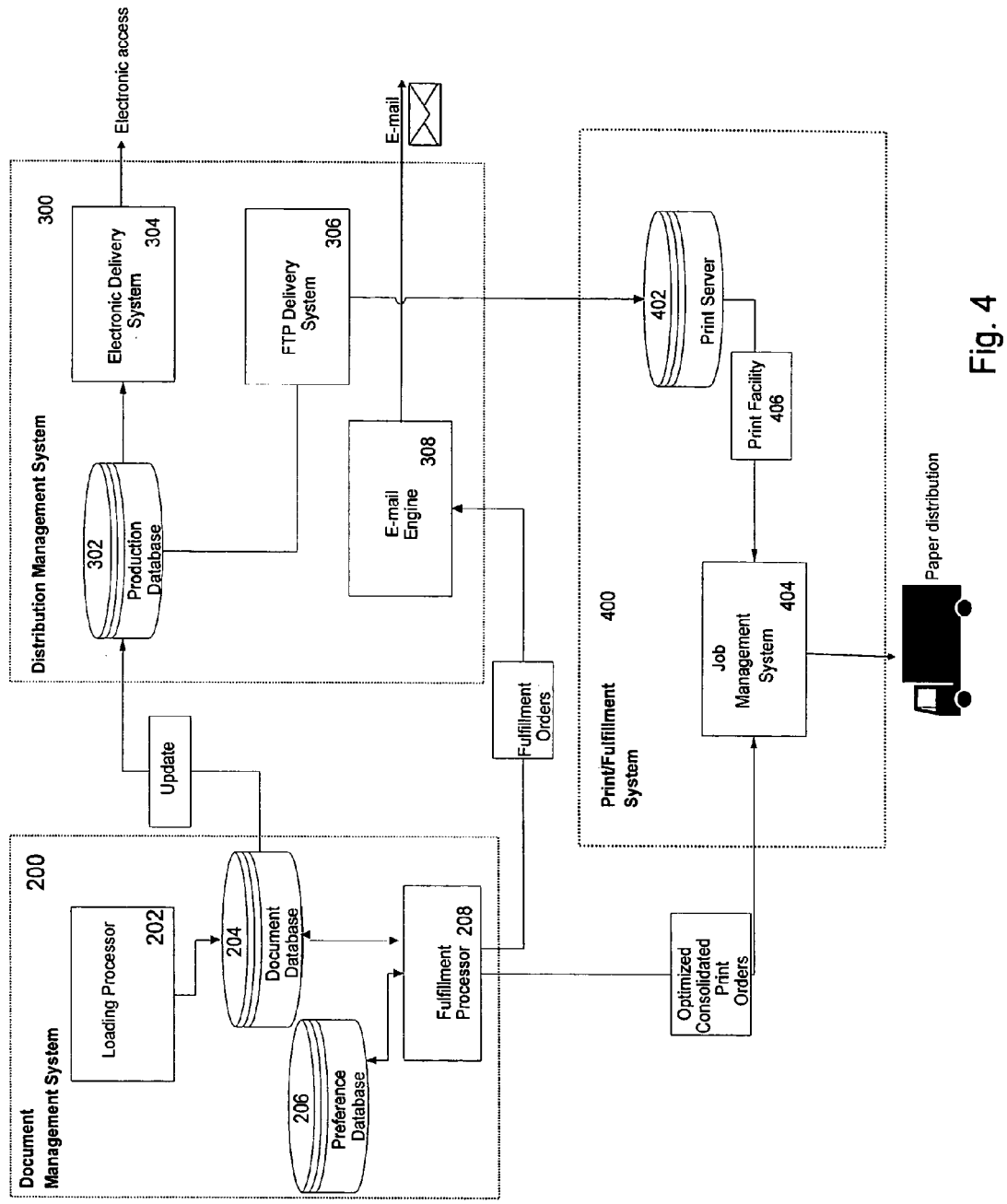
FIG. 4 shows how documents may be delivered by the system according to one embodiment.

In the embodiment shown in FIG. 1 and FIG. 4, the distribution management system 300, which handles electronic publication, and the print/fulfillment system 400, which handles print publication, are pictured as separate systems from each other and from the document management system 200. They may be embodied as separate systems and even controlled by separate entities, but it should be understood, however, that they may be centralized and that publication may be handled directly by the document management system 200. Although the systems are pictured separately in the illustrated embodiment, the document management system 200, the distribution management system 300, and the print/fulfillment system 400 may be located on similar machines and may share components. For example the document database 204, the preference database 206, the production database 302, and the print server 402 may be the same machine or may be split between two or more machines. For purposes of illustration, however, the functions of these systems are described separately, but it should be understood that there may be considerable overlap in their physical structure and in certain circumstances structures of the systems may be interchanged.

Continuing with the description of the embodiment shown in FIG. 4, once the fulfillment processor 208 determines to initiate publication it sends an order to either the distribution management system 300 or the print/fulfillment system 400. The portion of the compliance information to be published to the user 1000 depends on the preference instructions, delivery instructions and may also depend on the compliance rules. Whether the publication is electronic or in print also depends on the preference information and delivery instructions. Publication may also be both electronic and by print. If the publication is to be electronic, the fulfillment order is sent to the distribution management system 300.

Electronic delivery is particularly helpful in the area of delivering compliance information because of the cost of distributing compliance information on paper. For certain users who have consented, and many entities which must comply with the regulations, suppressing paper delivery and opting for electronic delivery is a preferred option.

The distribution management system 300 makes use of a production database 302 which contains the compliance information stored on the document database 204. The production database 302 is preferably regularly updated to ensure current information. That update may be done daily by a standard Oracle database update. The production database 302 provides the compliance information for the electronic delivery system 304. Although not shown in this embodiment the production database may also provide compliance information for other components such as the e-mail engine 308.

Electronic publication may take many forms. Compliance information may be sent by e-mail to a user 1000 and may either be contained in the email or sent as an attachment, it may be stored on a server to which the user is given access directly or through a webpage, it may be sent to the user on an information storage device (such as a CD, disc, or card) or may be sent directly to a user's computer over the Internet, through a different network, or over a wireless or telephone connection. If the compliance information is to be sent by e-mail, the compliance information is preferably sent from the fulfillment processor 208 to the e-mail engine 308 along with the delivery instructions. The compliance information may be formatted according to the preference information and other delivery instructions either by the fulfillment processor 208 or by the e-mail engine 308. The e-mail engine then publishes the compliance information to the user 1000 through an e-mail message. The compliance information may be contained in or attached to the e-mail message, or the e-mail message may contain a link to the compliance information which the user 1000 may follow. The compliance information may be presented to the user as a collection of data which may be formatted by the user or may be sent as a discrete document which the user may open (such as a spreadsheet file or .pdf or similar image file).

If a different form of electronic delivery is to be used the electronic delivery system 304 may handle the publication, however the e-mail engine 308, the print/fulfillment system 400, or some other system (such as a telephone message service) may be used to notify the user 1000 of the electronic publication of compliance information. This alternate notification may depend upon the preference information and delivery instructions/information. One method of publication allows the user 1000 to access the electronic delivery system 304 through an Internet website so that the user 1000 may obtain the appropriate compliance information stored on the production database 302, and preferably presented according to the preference information. The electronic delivery system 304 may incorporate a web server for this purpose. The compliance information stored on the production database 302 may be stored according to preference information, but preferably is stored in a default manner and the electronic delivery system 304 properly formats the compliance information according to the relevant preference information prior to viewing by the user 1000. Other electronic delivery, such as on an information device, or though a separate network, may be handled by the electronic delivery system 304 or other system. The distribution management system 300 may keep a record of each publication made. The document management system 200, and/or the print/fulfillment system 400 may also keep a record of publication history.

If publication of compliance information is to be by print the fulfillment processor 208 sends a print order to the print/fulfillment system 400. As with the orders sent to the distribution management system 300, orders to the print/fulfillment system 400 may be sent in batches or individually. The orders tell the print/fulfillment system 400 what compliance information to print and how it should be printed and sent according the preference information and delivery instructions. Orders are received by the job management system 404. The job management system obtains the compliance information from the print server 402. The print server 402 contained in the document warehouse manager 104 is regularly updated and may be identical to (or even the same exact database as) the production database 302 located within the distribution management system 300. The print server 402 may store compliance information as both discrete documents and as data which may be easily manipulated according to preference information to prepare individualized documents. The print facility 406 creates a hard copy of the individualized documents. The print facility 406 may be automated, manual, or a combination of both. The job management system 404 then prepares the printed compliance information for delivery to the user 1000. Print delivery may be by mail, fax, express, bulk mail, or other delivery. In one embodiment, the print/fulfillment system 400 is able to take advantage of bulk mailing rates by grouping investor mailings together. For example, all investors scheduled to receive mailings containing 5 pages may be all set to print and be mailed at the same time, thereby preserving the bulk mailing rates for those mailings. In this way costs may be reduced when distributing investor specific compliance information.

In one embodiment dealing with securities information the print/fulfillment system 400 may maintain an XML database of legally filed compliant envelopes for all variable contract prospectuses and sub-funds. This database may be located with the print server 402. Each compliant envelope may include, for a particular security, the Annual Report, Semi-Annual Report, Prospectus, Statement of Additional Information and all filed Supplements. This database may be sourced directly from EDGAR, where all mutual fund and insurance complaints must file these legal documents. Once obtained, the system converts the data to XML, HTML, and/or required print formats in a processing step similar to that described above for the loading processor 202. These formats may be maintained in a compliant and programmatically updated warehouse where thousands of filing changes occur each day, affecting up to one third of the database. Preferably, all updates may be completed by the time the next day's trading begins. This particular XML and database manipulation allows reduction of page counts for printed compliance information by eliminating unnecessary pages from the fulfillment processor. A significant advantage of the XML format is the easy tailoring for a participant, and resultant reduction in page count.

In prior art methods of distributing compliance information, investors were provided with large packets of materials, many of which were irrelevant to the investor. One result of providing information in the present manner is a reduction in costs associated with sorting and coordinating the appropriate information for each individual. One embodiment of the system, provides paper information for investors that is coordinated for each individual investor.

Figure 5:
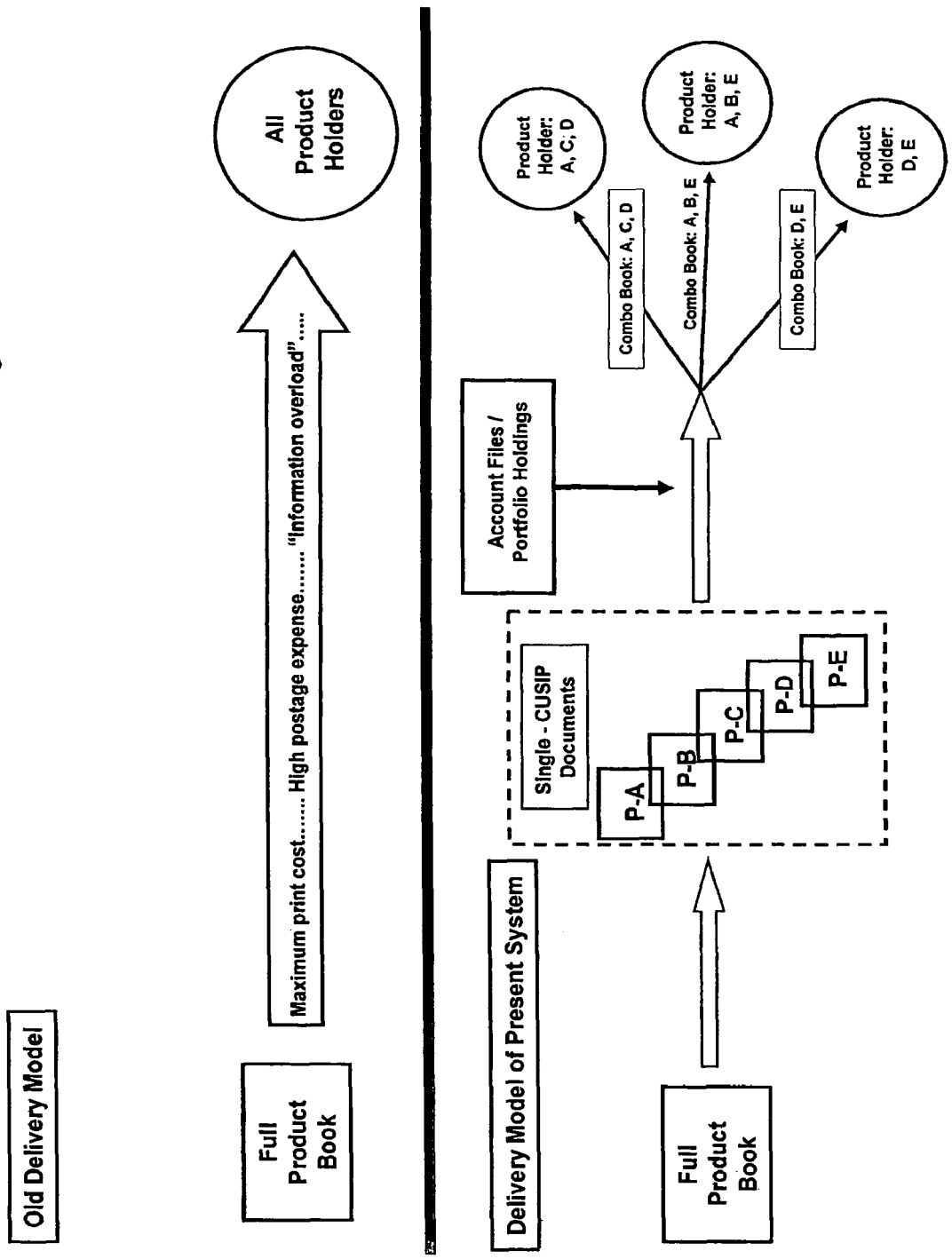
FIG. 5 shows a general comparison of how document delivery occurs with prior art systems and with one embodiment.

As illustrated in FIG. 5, the prior art system of sending a full product book of compliance information to a user is replaced by the present system of dividing the full product book into compliance information for several products. That specific compliance information may be arranged as individual documents by CUSIP number. They are then matched with individual investors' account holdings. Those product holders are then sent an appropriate book which combines only the relevant information for that particular user.

The method of print arrangement offered by the present system and method is faster, more tailored to the user preference and less costly than sending hundreds of pages of information (much of it irrelevant to the user) to each user every time new securities information is distributed. The present system and method allow real-time printing which may incorporate branding and tailoring of the delivery to the appropriate brokerage or end user.

The combination of preference based electronic and paper delivery allows information distributors to dramatically reduce expenses from their current inefficient warehouse practices. It also creates the ability to easily incorporate users who decide to consent to electronic deliver. For print delivery, the system may be optimized so that job volume is distributed and organized to minimize costs. Customized features and logic may be used to minimize the number of total mailings. The system also allows the use fund profiles in place of prospectuses in the pre-sales distribution. The system may provide fund profiles tailored to the wishes of the provider/brokerage and may deliver the confirming prospectus upon the establishment of a subfund position. This may generate tremendous further savings and through the use of fund profiles, deliver more relevant information to the investor. Once a position is established, the prospectus may be sent out on a portfolio-specific basis.

This combined system of electronic delivery and specifically formatted paper delivery provides compliance at significantly lower cost and much higher customer satisfaction than traditional warehouse and offset printing approaches.

Unless specifically stated herein, it should not be assumed that any described particular aspect or element of the system is essential. Further, variations, modifications, and other implementations of what is described herein will occur to those of ordinary skill in the art without departing from the spirit and the scope of the invention as claimed. In addition, in view of the foregoing description, one of ordinary skill in the art will understand that equivalent structures may be available to achieve the same results as those described above. Accordingly, the spirit and scope of the following claims should not be limited to the descriptions of the examples described herein.

What is claimed is:

1. At least one computer-readable tangible medium having software instructions encoded thereon which, when executed, cause at least one computer to perform a method for providing securities information to a user, the method comprising:
    obtaining user information comprising one or more of contact information for the user, an identification of at least one security owned by the user, display preference information for the user and delivery preference information for the user;
    obtaining securities information relating to a plurality of securities, a first subset of the plurality of securities being the at least one security owned by the user;
    in response to at least one event comprising a time event, transfer event, market event and/or change in securities information relating to one or more of the first subset of the plurality of securities, identifying, based on the user information, a portion of the securities information to deliver to the user, the identified portion relating to at least the one or more of the first subset of the plurality of securities;
    customizing, based on one or more of the contact information for the user, identification of the at least one security owned by the user, display preference information for the user or delivery preference information for the user, the identified portion of securities information; and
    causing the customized portion of securities information to be sent to the user.

2. The at least one computer-readable medium of claim 1 wherein the customized portion of securities information sent to the user is sent electronically.

3. The at least one computer-readable medium of claim 1 wherein the customized portion of securities information sent to the user is sent on paper.

4. The at least one computer-readable medium of claim 1 wherein the user information is obtained from the user.

5. The at least one computer-readable medium of claim 1 wherein the user information is obtained from a brokerage.

6. The at least one computer-readable medium of claim 1 wherein the securities information is obtained from EDGAR.

7. The at least one computer-readable medium of claim 1 wherein the securities information is obtained from a brokerage.

8. The at least one computer-readable medium of claim 1 wherein the securities information is obtained from a publicly traded corporation.

9. The at least one computer-readable medium of claim 1, wherein the user information and/or securities information is obtained from at least one brokerage.

10. The at least one computer-readable medium of claim 1, wherein the at least one event comprises a change in securities information, and the change in securities information comprises a new or modified piece of securities information becoming available.

11. The at least one computer-readable medium of claim 1, wherein the at least one event comprises a time event, and the time event comprises a beginning of a calendar and/or fiscal year.

12. The at least one computer-readable medium of claim 1, wherein the at least one event comprises a transfer event, and the transfer event comprises the user buying or selling a security.

13. The at least one computer-readable medium of claim 1, wherein the at least one event comprises a market event, and the market event comprises a split or reverse split of a security offered for sale on a market, or a takeover, merger or acquisition of an entity offering a security for sale on a market.

14. The at least one computer-readable medium of claim 1, wherein the user information further comprises historical delivery information for the user.

15. The at least one computer-readable medium of claim 1, wherein the customized portion of securities information is contained within at least one document.

16. The at least one computer-readable medium of claim 2, wherein the customized portion of securities information is contained within at least one document.

17. The at least one computer-readable medium of claim 3, wherein the customized portion of securities information is contained within at least one document.

18. A system, comprising:
    at least one processor programmed to:
        obtain user information comprising one or more of contact information for the user, an identification of at least one security owned by the user, display preference information for the user and delivery preference information for the user;
        obtain securities information relating to a plurality of securities, a first subset of the plurality of securities being the at least one security owned by the user;
        in response to at least one event comprising a time event, transfer event, market event and/or change in securities information relating to the one or more of the first subset of the plurality of securities, identify, based on the user information, a portion of the securities information to deliver to the user, the identified portion relating to at least the one or more of the first subset of the plurality of securities;
        customize, based on one or more of the contact information for the user, identification of the at least one security owned by the user, display preference information for the user or delivery preference information for the user, the identified portion of securities information; and
        cause the customized portion of securities information to be sent to the user.

19. The system of claim 18, wherein the customized portion of securities information is sent electronically to the user.

20. The system of claim 19, wherein the user information further comprises historical delivery information for the user.

21. The system of claim 18, wherein the customized portion of securities information is sent on paper to the user.

22. The system of claim 21, wherein the customized portion of securities information is contained within at least one document.

23. The system of claim 18, wherein the user information is obtained from the user.

24. The system of claim 18, wherein the user information is obtained from a brokerage.

25. The system of claim 18, wherein the securities information is obtained from EDGAR.

26. The system of claim 18, wherein the securities information is obtained from a brokerage.

27. The system of claim 18, wherein the securities information is obtained from a publicly traded corporation.

28. The system of claim 18, wherein the user information and/or securities information is obtained from at least one brokerage.

29. The system of claim 18, wherein the at least one event comprises a change in securities information, and the change in securities information comprises a new or modified piece of securities information becoming available.

30. The system of claim 18, wherein the at least one event comprises a time event, and the time event comprises a beginning of a calendar and/or fiscal year.

31. The system of claim 18, wherein the at least one event comprises a transfer event, and the transfer event comprises the user buying or selling a security.

32. The system of claim 18, wherein the at least one event comprises a market event, and the market event comprises a split or reverse split of a security offered for sale on a market, or a takeover, merger or acquisition of an entity offering a security for sale on a market.

33. The system of claim 18, wherein the user information further comprises historical delivery information for the user.

34. The system of claim 18, wherein the customized portion of securities information is contained within at least one document.

* * * * *